(12) United States Patent
Queener

(10) Patent No.: US 9,717,966 B1
(45) Date of Patent: Aug. 1, 2017

(54) GOLF ACCESSORY SUPPORT SYSTEM

(71) Applicant: Derek A. Queener, Clearwater, FL (US)

(72) Inventor: Derek A. Queener, Clearwater, FL (US)

( * ) Notice: Subject to any disclaimer, the term of this patent is extended or adjusted under 35 U.S.C. 154(b) by 0 days.

(21) Appl. No.: 14/520,395

(22) Filed: Oct. 22, 2014

Related U.S. Application Data

(60) Provisional application No. 61/898,709, filed on Nov. 1, 2013.

(51) Int. Cl.
*A63B 55/00* (2015.01)
*A63B 57/00* (2015.01)
*F16M 13/02* (2006.01)

(52) U.S. Cl.
CPC .............. *A63B 57/00* (2013.01); *A63B 55/00* (2013.01); *A63B 55/408* (2015.10); *F16M 13/02* (2013.01)

(58) Field of Classification Search
CPC ....... A63B 57/00; A63B 55/00; A63B 55/008; A63B 55/02; F16M 13/02
USPC ................ 248/341, 317, 323, 327, 328, 339
See application file for complete search history.

(56) References Cited

U.S. PATENT DOCUMENTS

| | | | | |
|---|---|---|---|---|
| 1,957,577 A * | 5/1934 | Chapman | ............. | A63B 55/007 150/160 |
| 4,361,934 A * | 12/1982 | Darnell | ............... | A63B 71/0672 24/11 PP |
| 5,038,984 A * | 8/1991 | Izzo | ........................ | A45C 13/30 206/315.3 |
| 5,988,475 A * | 11/1999 | Han | .......................... | A45F 3/04 224/608 |
| 6,006,974 A * | 12/1999 | Varney | .................... | A45C 13/30 224/259 |
| 6,530,131 B1 * | 3/2003 | Hopkins | .................... | A45F 5/00 24/3.13 |
| 2003/0146255 A1 * | 8/2003 | Machover | ................. | A45F 5/02 224/148.7 |
| 2004/0089686 A1 * | 5/2004 | Pratt | ...................... | A45C 13/38 224/265 |
| 2004/0144820 A1 * | 7/2004 | Herold | ................. | A63B 55/408 224/605 |
| 2005/0115850 A1 * | 6/2005 | Holub | .................. | A63B 55/408 206/315.5 |
| 2006/0049223 A1 * | 3/2006 | Mora | ................. | A63B 71/0672 224/162 |
| 2010/0064485 A1 * | 3/2010 | Blevins | ................ | A63B 55/007 24/306 |
| 2012/0118923 A1 * | 5/2012 | Allen | ...................... | A63B 57/00 224/191 |

(Continued)

*Primary Examiner* — Joshua J Michener
*Assistant Examiner* — Kyle Walraed-Sullivan

(57) ABSTRACT

A support device is formed in a Y-shaped configuration having a lower assembly and upper arms and a ring coupled to lower extents of the upper arms and to an upper extent of the lower assembly. The upper arms include two gypsy studs attached to the upper arms remote from the ring. The gypsy studs are removably attachable to a golf bag. The lower assembly includes an upper section with upper and lower ends. The lower assembly includes a lower section with upper and lower ends. The lower assembly includes a release mechanism separably coupling the upper and lower sections. A clip is attached to the lower end of the lower section for removably receiving and supporting a golf accessory.

1 Claim, 3 Drawing Sheets

(56) References Cited

U.S. PATENT DOCUMENTS

2013/0212898 A1* 8/2013 Reynolds .................. G09F 1/10
  34/239
2014/0097109 A1* 4/2014 Hayes .................. A63B 55/008
  206/315.1

* cited by examiner

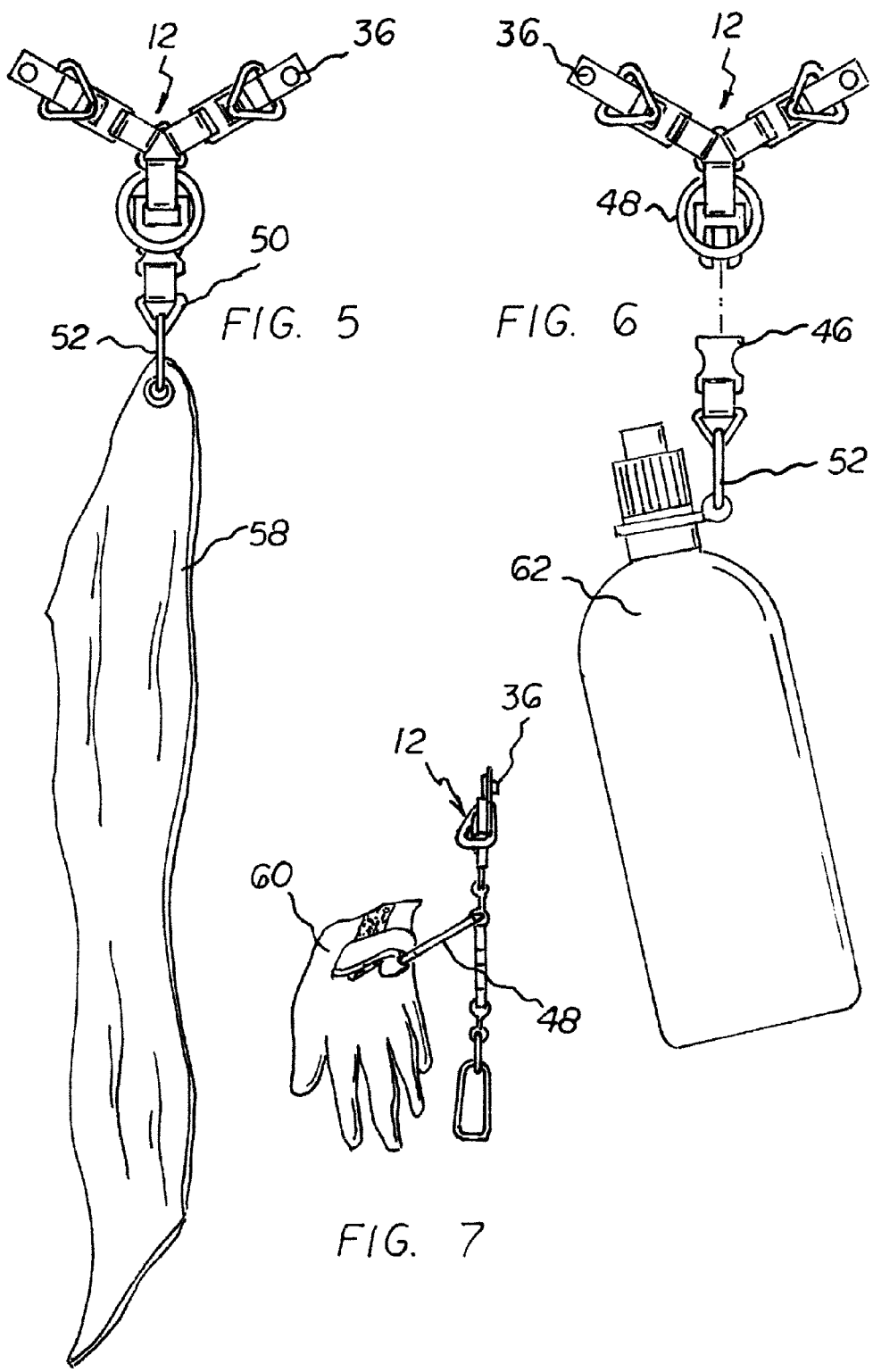

GOLF ACCESSORY SUPPORT SYSTEM

BACKGROUND OF THE INVENTION

Field of the Invention

The present invention relates to a golf accessory support system and more particularly pertains to removably coupling accessories to a golf bag.

Description of the Prior Art

The use of golfing accessories is known in the prior art. More specifically, golfing accessories previously devised and utilized for the purpose of attaching accessories to golf bags are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, the known devices do not describe golf accessory support system that allows removably coupling accessories to a golf bag.

In this respect, the golf accessory support system according to the present invention substantially departs from the conventional concepts and designs of the prior art, and in doing so provides an apparatus primarily developed for the purpose of removably coupling accessories to a golf bag.

Therefore, it can be appreciated that there exists a continuing need for a new and improved golf accessory support system which can be used for removably coupling accessories to a golf bag. In this regard, the present invention substantially fulfills this need.

SUMMARY OF THE INVENTION

In view of the foregoing disadvantages inherent in the known types of golfing accessories now present in the prior art, the present invention provides an improved golf accessory support system. As such, the general purpose of the present invention, which will be described subsequently in greater detail, is to provide a new and improved golf accessory support system and method which has all the advantages of the prior art and none of the disadvantages.

To attain this, the present invention essentially comprises a support device formed in a Y-shaped configuration having a lower assembly and upper arms and a ring coupled to lower extents of the upper arms and to an upper extent of the lower assembly. The upper arms include two gypsy studs attached to the upper arms remote from the ring. The gypsy studs are removably attachable to a golf bag. The lower assembly includes an upper section with upper and lower ends. The lower assembly includes a lower section with upper and lower ends. The lower assembly includes a release mechanism separably coupling the upper and lower sections. A clip is attached to the lower end of the lower section for removably receiving and supporting a golf accessory.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved golf accessory support system which has all of the advantages of the prior art golfing accessories and none of the disadvantages.

It is another object of the present invention to provide a new and improved golf accessory support system which may be easily and efficiently manufactured and marketed.

It is further object of the present invention to provide a new and improved golf accessory support system which is of durable and reliable constructions.

An even further object of the present invention is to provide a new and improved golf accessory support system which is susceptible of a low cost of manufacture with regard to both materials and labor, and which accordingly is then susceptible of low prices of sale to the consuming public, thereby making such golf accessory support system economically available to the buying public.

Even still another object of the present invention is to provide a golf accessory support system for removably coupling accessories to a golf bag.

Lastly, it is an object of the present invention to provide a new and improved golf accessory support system including a support device and a golf bag, the support device being removably attached to the golf bag at any of a plurality of locations, the support device adapted to removably couple any of a plurality of golf accessories to the golf bag at a convenient location, the attaching of the support device to the golf bag and the coupling of the golf accessories to the support device being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 5, 6 and 7 are front elevational views of the system with golf accessories coupled to the support device, the golf accessories including a towel, a glove and a water bottle.

The same reference numerals refer to the same parts throughout the various Figures.

DESCRIPTION OF THE PREFERRED EMBODIMENT

Figure 1:
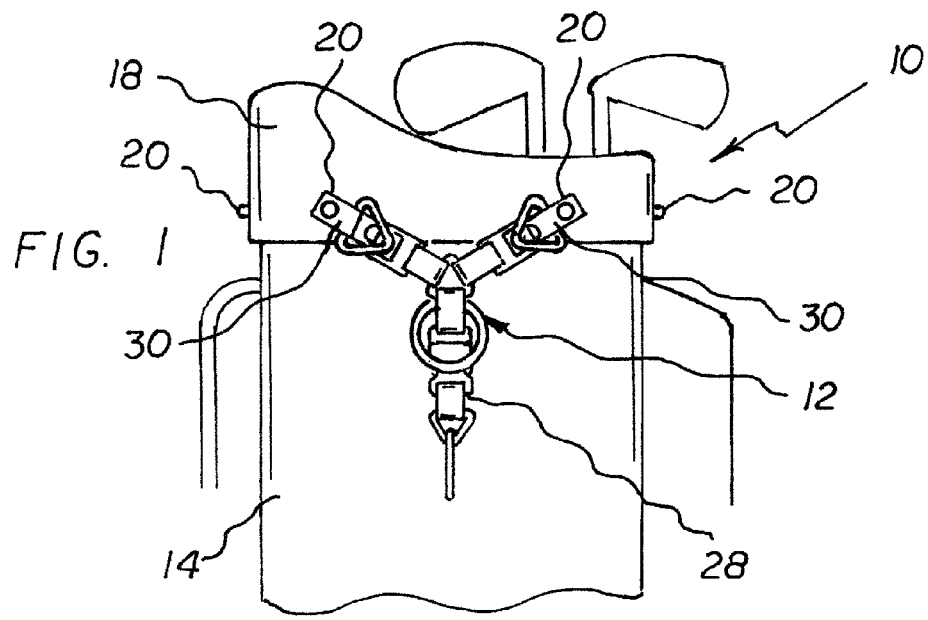
FIG. 1 is a front elevational view of a golf accessory support system formed of a golf bag and a support device, the system being constructed in accordance with the principles of the present invention.
Figure 2:
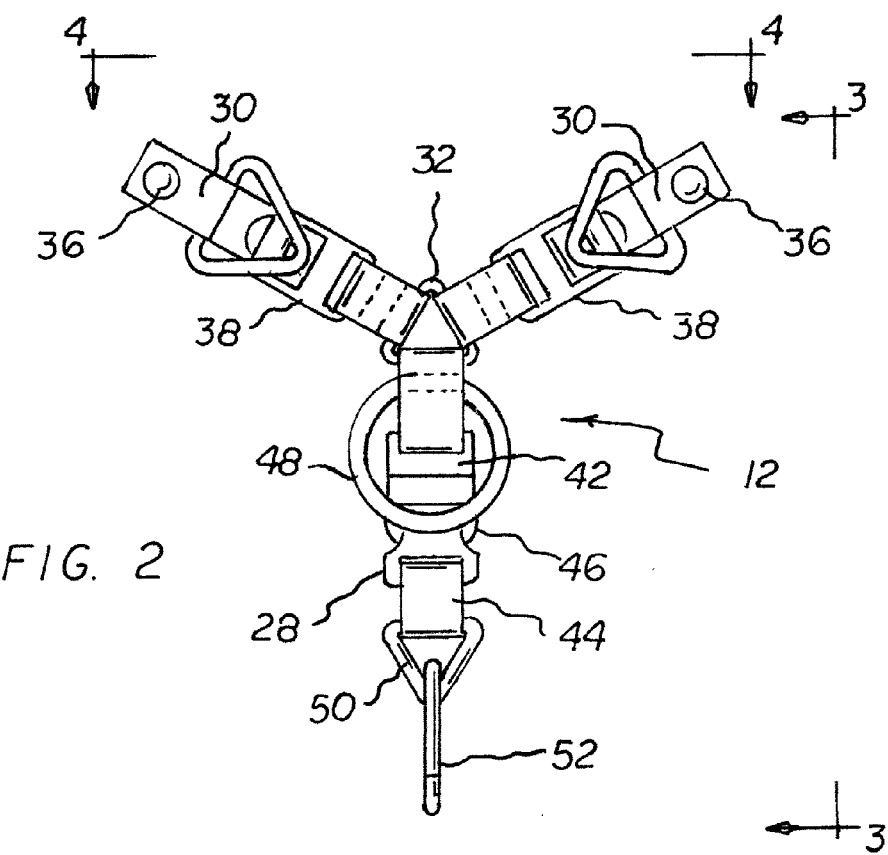
FIG. 2 is a front elevational view of the support device shown in FIG. 1.
Figure 3:
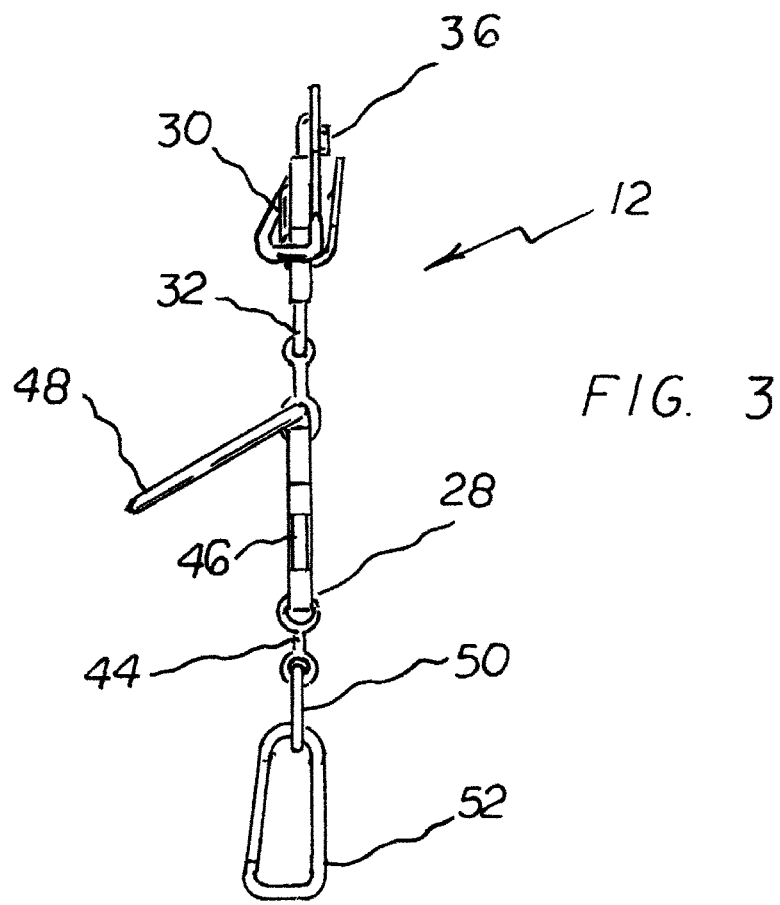
FIGS. 3 and 4 are a side elevational view and a plan view of the taken along lines 3-3 and 4-4 of FIG. 2.
Figure 4:
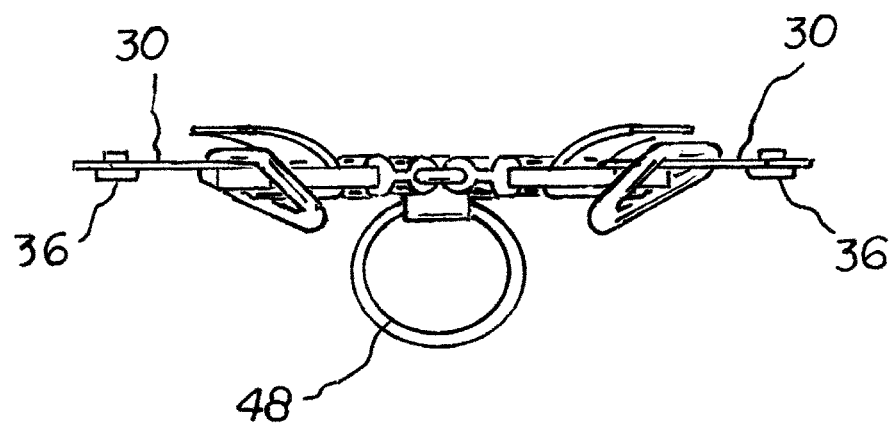

With reference now to the drawings, and in particular to FIG. 1 thereof, the preferred embodiment of the new and improved golf accessory support system embodying the principles and concepts of the present invention and generally designated by the reference numeral 10 will be described.

The present invention, the golf accessory support system 10 is comprised of a plurality of components. Such components are individually configured and correlated with respect to each other so as to attain the desired objective. In their broadest context such include a support device, upper arms, and a lower support assembly. In this broad context, first provided is a support device. The support device is formed in a Y-shaped configuration. The support device has a lower assembly, upper arms, and a ring. The ring is coupled to lower extents of the upper arms and to an upper extent of the lower assembly.

The upper arms include two snaps attached to the upper arms remote from the ring. The snaps are removably attachable to a golf bag.

The lower assembly includes an upper section with upper and lower ends. The lower assembly includes a lower section with upper and lower ends. The lower assembly includes a release mechanism. The release mechanism separably couples the upper and lower sections. A clip is attached to the lower end of the lower section for removably receiving and supporting a golf accessory.

Such components are individually configured and correlated with respect to each other so as to attain the desired objective.

In the preferred embodiment of the golf accessory support system, designated by reference numeral 10, first provided is a golf bag 14. The golf bag has a bottom. The golf bag has a top. The golf bag also has a peripheral side wall. The side wall includes a front, a rear, a left side, and a right side. The side wall forms a neck 18. The neck is positioned adjacent to the top. Laterally spaced male snaps 20 are provided. The male snaps are permanently attached to the neck at the front of the golf bag. Laterally spaced male snaps are also permanently attached to the ring at the left side and the right side of the golf bag.

A support device 12 is provided. The support device is formed in a Y-shaped configuration. The support device has a lower assembly 28. The support device has laterally spaced upper arms 30. The support device has an equilateral triangular ring 32. The triangular ring is fabricated of high density polyethylene. The triangular ring is coupled to a lower extent of the upper arms and to an upper extent of the lower assembly. The upper arms extend outwardly from the triangular ring at an angle of 60 degrees. Two symmetric rings 34 are coupled to an associated upper arm. Each of the symmetric rings is fabricated of high density polyethylene.

The upper arms include two gypsy rings 36. Each of the two gypsy rings is permanently attached to each of the upper arms at a location remote from the triangular ring. The two gypsy rings are removably attached to two adjacent male snaps on the golf bag. In this manner the support device may be selectively positioned to the golf bag at any of a plurality of locations. The upper arms include two upper adjustment brackets 38 on the upper arm. One of the two upper adjustment brackets is located in an associated upper arm between an associated female clip and the triangular ring.

The lower assembly includes an upper section 42. The upper section has an upper end and a lower end. The lower assembly includes a lower section 44. The lower section has an upper end and a lower end. The lower assembly includes a release mechanism 46. The release mechanism separably couples the lower end of the upper section and the upper end of the lower section. The lower assembly includes a circular ring 48. The circular ring is fabricated of high density polyethylene. The circular ring is provided at an intermediate region of the upper section. An accessory support lower ring 50 is provided. The lower ring is attached to the lower end of the lower section. A carabineer clip 52 is provided. The carabineer clip is attached to the lower ring.

Provided last is at least one golf accessory. The golf accessory is removably coupled to the support device and the golf bag through the carabineer clip. At least one golf accessory is chosen from the class of golfing accessories. The class of golfing accessories includes a towel 58. The class of golfing accessories also includes a glove 60. The class of golfing accessories further includes a water bottle 62.

The present invention includes a support device which is a heavy-duty, attachable, adjustable, two piece golf hanger accessory for multiple accessories. It enables golfers (1) to add multiple accessories on one device in a location on their golf bag convenient to them; (2) to add accessories with excess weight, i.e., wet golf towel or water bottle, without fear of losing item; (3) to remove accessories with devices detachable feature, easily and quickly; and (4) to reattach without wearing out to device failure, i.e., snapping and unsnapping buttons or velcro.

The invention operates by attaching two polypropylene straps by way of push snaps onto the golf bag. It uses two connection points instead of just one to allow maximum holding power for heavier items intended to be attached. It has adjustable buckles which enable it to fit any manufacturer's golf bag and allows connection to any two snaps on all sides of the bag. It has a two part, side release buckle that enables the removal of the lower section of the device without having to remove the whole device. This ensures longevity of the product and convenience of removing an accessory and reattaching it with ease.

The device connects to a golf bag using push snap buttons which attach to the snap buttons on the golf bag. The next of the components are connected by threading the straps through the adjustment buckles on the top ends of the buckle and then both bottom ends of the strap are looped around and sewn onto the left and right side of the plastic triangular ring. The next piece of webbing strap is attached at the bottom of the triangular ring, which holds the accessory ring by stitching above and below the strap slot. On the bottom of this webbing is the male connector of the side release buckle which is connected by looping the strap through the opening in the buckle and sewing. The male end of the buckle snaps into the female end of the buckle, which has webbing strap looped through and sewn to secure it. At the bottom of this web strap is another triangular shaped lower ring which the strap loops through and is also sewn. The last connection is the carabineer for accessory attachment if needed.

This invention operates by fastening to any golf bag as described above and allows maximum holding power with the 2 snap, angled heavy duty strap design. It contains multiple accessory capability with several attachment systems in the design. The attachment ability to all four sides of the golf bag, due to the adjustable strap capability, makes options available depending on where accessories are placed based on golfer preference. The detachable feature enables a golfer to remove his/her towel to take to the putting green, or to remove the club cleaning brush rather than using a retractable cord with limited range which is often non-functional due to poor construction. It also allows for a sport bottle to be attached and removed for golfers that walk and carry or pull-cart their clubs. The strength and versatility of this invention makes multiple operations possible all in one product, with durability as well as functionality. There are other ways to construct this invention, but this design has all the components combined to make an all-in-one product, which is durable and functional and that will last the test of time and rough terrain. The fact that it can be used in more than one way with regard to preferential placement of the device, numerous accessory application areas, and a detaching component makes this a unique and useful product.

The Components include:

1—1 inch heavy weight polypropylene webbing to hold the weight of any golf accessory or reasonably sized sport bottle.

2—1¼ inch wide, 1½ inch long, plastic strap adjusting buckles which will enable this device to attach firmly, to any golf bags existing snaps, simply by adjusting the strap length; whether it be on the front, either side of the bag or across the back if needed. Due to the variation in golf bag manufacturer's designs, this feature makes it a very adaptable accessory.

2—1 inch plastic triangles, one at the top half of the device which allows the angle of the attachment straps to be correct in relation to the attachment areas, additional load strength, aesthetically pleasing appearance and to allow the device to lay closely to the golf bag. The second plastic triangle is located on the lower, detachable half of the device, which will allow golf brushes, towels or water bottles to be detached and reattached from the upper half of the device with ease.

1—2 piece, 2¼ inch long, connected, 1¼ inch wide, side release buckle which as stated above, will allow a golfer to detach their golf club cleaner, golf towel or, if walking, a sport bottle of reasonable size.

1—Plastic "ring", 1½ inch diameter which enables attachment to the device with little side to side movement. This part of the device can be used for attachment of a golf glove(s), additional towel or other accessories with clip on capabilities.

2—Gypsy snaps to attach to golf bag.

2–1 inch plastic/rubber rings to secure adjustable attachment strap to itself once fixed to golf bag.

The last piece of this device will be a mini carabineer to attach towels with eyelets or other accessories required by consumer.

The purpose of this device is to give the golfer more convenient options than manufacturers provide as well as more options with regards to how many and where he or she can hang their golf accessories. A brand new, top of the line golf bag may only give one option with which to hang accessories and in most cases it is not enough, improperly positioned, or forces golfers to put all accessories on one hanger. It makes using the accessories designed for golf difficult, due to all of them being, essentially, intertwined with each other. It allows golfers to attach a wet and a dry towel, one to clean their clubs and one for hands and face, etc. The fact that this device has two attachment points and uses heavy weight webbing allows for a wet towel or even a sport bottle for golfers that walk and carry their bag. The two-part side release buckles allow golfers to remove the bottom half with ease to take their towel to the green and wipe their golf ball, to remove their golf club cleaner or any accessory without removing the whole device. The purpose for this device is to give golfers options and convenience for adding golf accessories and a product design that is strong enough to do so.

The present invention includes a support device which is a heavy-duty, attachable, adjustable, two piece-multiple accessory golf hanger on. It enables golfers (1) to add multiple accessories on one device in a location on their golf bag convenient to them; (2) to add accessories with excess weight, i.e., wet golf towel or water bottle, without fear of losing item; (3) to remove accessories with devices detachable feature, easily and quickly and (4) to reattach without wearing out to device failure, i.e., snapping and unsnapping buttons or velcro.

The invention operates by attaching two polypropylene straps by way of push snaps onto the golf bag. It uses two connection points instead of just one to allow maximum holding power for heavier items intended to be attached. It has adjustable buckles which enable this device to fit any manufacturer's golf bag and allows connection to any two snaps on all sides of the bag. It has a two part, a side release buckle that enables the removal of the lower section of the device without having to remove the whole device. This ensures longevity of the product and convenience to remove accessory and reattach with ease.

The device connects to golf bag using push snap buttons which attach to the snap buttons on the golf bag. The next of the components are connected by threading the straps through the adjustment buckles on the top ends of the buckle and then both bottom ends of the strap are looped around and sewn onto the left and right side of the plastic triangular ring. The next piece of webbing strap is attached at the bottom of the triangular ring, which holds the accessory ring by stitching above and below the strap slot. On the bottom of this webbing is the male connector of the side release buckle which is connected by looping the strap through the opening in the buckle and sewing. The male end of the buckle snaps into the female end of the buckle, which has webbing strap looped through and sewn to secure it. At the bottom of this web strap is another triangular shaped lower ring which the strap loops through and is also sewn. The last connection is the carabineer for accessory attachment if needed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A golf accessory support system (10) including a support device (12) and a golf bag (14), the support device being removably attached to the golf bag at any of a plurality of locations, the support device adapted to removably couple any of a plurality of golf accessories to the golf bag, the system comprising, in combination:

the golf bag (14) having a bottom and a top and a peripheral side wall, the peripheral side wall including a front and a rear and a left side and a right side, the peripheral side wall forming a neck (18) adjacent to the top, laterally spaced male snaps (20) permanently attached to the neck at the front of the golf bag, laterally spaced male snaps (20) permanently attached to the neck;

the support device (12) formed in a Y-shaped configuration having a lower assembly (28) and laterally spaced upper arms (30), an equilateral triangular ring (32) fabricated of polyethylene coupled to a lower extent of the laterally spaced upper arms and to an upper extent of the lower assembly, the laterally spaced upper arms extending outwardly from the equilateral triangular ring at an angle of 60 degrees, two symmetric triangular rings (34), each of the two symmetric triangular rings fabricated of polyethylene and coupled to an associated upper arm;

the laterally spaced upper arms including two gypsy studs (36), one of the two gypsy studs permanently attached to each of the laterally spaced upper arms at a location remote from the equilateral triangular ring, the two gypsy studs removably attached to two adjacent male snaps on the golf bag for the selective positioning of the support device to the golf bag at any of a plurality of locations, two upper adjustment brackets (38) on the laterally spaced upper arms, one of the two upper adjustment brackets located in an associated upper arm between an associated female clip and the equilateral triangular ring;

the lower assembly including an upper section (42) with an upper end and a lower end, the lower assembly including a lower section (44) with an upper end and a lower end, the lower assembly including a release mechanism (46) separably coupling the lower end of the upper section and the upper end of the lower section, a circular ring (48) fabricated of polyethylene for accessory support, a lower ring (50) attached to the lower end of the lower section, a carabineer clip (52) attached to the lower ring; and at least one golf accessory removably coupled to the support device and the golf bag through the carabineer clip, the at least one golf accessory chosen from the class of golfing accessories including a towel (58), a glove (60) and a water bottle (62).

* * * * *